US012753456B2

(12) United States Patent
Aoyama et al.

(10) Patent No.: US 12,753,456 B2
(45) Date of Patent: Oct. 6, 2026

(54) HIGH-STRENGTH ELECTROGALVANNEALED STEEL SHEET AND METHOD FOR MANUFACTURING THE SAME

(71) Applicant: JFE Steel Corporation, Tokyo (JP)

(72) Inventors: Mai Aoyama, Chiyoda-ku (JP); Kazuaki Tsuchimoto, Tokyo (JP); Yusuke Fushiwaki, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 504 days.

(21) Appl. No.: 18/199,451

(22) Filed: May 19, 2023

(65) Prior Publication Data

US 2023/0287534 A1 Sep. 14, 2023

Related U.S. Application Data

(62) Division of application No. 16/960,733, filed as application No. PCT/JP2018/045856 on Dec. 13, 2018, now abandoned.

(30) Foreign Application Priority Data

Jan. 17, 2018 (JP) ................................ 2018-005418

(51) Int. Cl.

*C21D 9/46* (2006.01)
*B32B 15/01* (2006.01)

(Continued)

(52) U.S. Cl.

CPC .............. *C21D 9/46* (2013.01); *B32B 15/013* (2013.01); *C21D 6/001* (2013.01); *C21D 6/002* (2013.01);

(Continued)

(58) Field of Classification Search

CPC .......... C21D 9/46; C21D 6/001; C21D 6/002; C21D 6/005; C21D 6/008; B32B 15/013;

(Continued)

(56) References Cited

U.S. PATENT DOCUMENTS 5,015,341 A 5/1991 Guzzetta et al.
10,544,474 B2 * 1/2020 Azuma .................... C23C 2/26

(Continued)

FOREIGN PATENT DOCUMENTS

CN 102482753 A 5/2012
CN 104066864 A 9/2014

(Continued)

OTHER PUBLICATIONS

Chinese Office Action with Search Report for Chinese Application No. 201880086633.5, dated Mar. 31, 2021, 12 pages.

(Continued)

*Primary Examiner* — John A Hevey
(74) *Attorney, Agent, or Firm* — Buchanan Ingersoll & Rooney PC

(57) ABSTRACT

Provided are a high-strength electrogalvannealed steel sheet that has a TS of 780 MPa or higher and a method for manufacturing the high-strength electrogalvannealed steel sheet. The high-strength electrogalvannealed steel sheet has a composition including, in terms of % by mass, C: 0.030% or more and 0.250% or less, Si: 0.01% or more and 3.00% or less, Mn: 1.00% or more and 10.00% or less, P: 0.001% or more and 0.100% or less, and S: 0.0001% or more and 0.0200% or less, with the balance being Fe and unavoidable impurities. The steel sheet has an electrogalvannealed coating layer on a surface thereof. The electrogalvannealed coating layer has an Fe content of 8.0% to 15.0%. The steel (Continued)

sheet has a tensile strength of 780 MPa or higher. The steel sheet has a diffusible hydrogen content of 0.2 wt. ppm or less.

7 Claims, 1 Drawing Sheet

(51) Int. Cl.

| | |
|---|---|
| ***C21D 6/00*** | (2006.01) |
| ***C22C 38/00*** | (2006.01) |
| ***C22C 38/02*** | (2006.01) |
| ***C22C 38/06*** | (2006.01) |
| ***C22C 38/08*** | (2006.01) |
| ***C22C 38/12*** | (2006.01) |
| ***C22C 38/28*** | (2006.01) |
| ***C22C 38/38*** | (2006.01) |
| ***C25D 3/22*** | (2006.01) |
| ***C25D 5/36*** | (2006.01) |
| ***C25D 5/50*** | (2006.01) |
| ***C25D 7/06*** | (2006.01) |

(52) U.S. Cl.

CPC ............. *C21D 6/005* (2013.01); *C21D 6/008* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/12* (2013.01); *C22C 38/28* (2013.01); *C22C 38/38* (2013.01); *C25D 5/36* (2013.01); *C25D 5/50* (2013.01); *C25D 3/22* (2013.01); *C25D 7/0614* (2013.01)

(58) Field of Classification Search

CPC ... C22C 38/001; C22C 38/002; C22C 38/005; C22C 38/008; C22C 38/02; C22C 38/06; C22C 38/08; C22C 38/12; C22C 38/28; C22C 38/38; C22C 18/04; C22C 38/14; C22C 38/16; C22C 38/04; C22C 38/60; C22C 38/58; C25D 5/36; C25D 5/50; C25D 3/22; C25D 7/0614

See application file for complete search history.

(56) References Cited

U.S. PATENT DOCUMENTS

| | | | | |
|---|---|---|---|---|
| 2016/0002807 | A1* | 1/2016 | Taira | C25F 1/06 148/241 |
| 2016/0122845 | A1 | 5/2016 | Akiba et al. | |
| 2016/0214351 | A1 | 7/2016 | Harako et al. | |
| 2017/0044640 | A1 | 2/2017 | Kimura et al. | |
| 2017/0218475 | A1 | 8/2017 | Kawasaki et al. | |
| 2017/0253943 | A1 | 9/2017 | Makimizu et al. | |
| 2018/0010207 | A1 | 1/2018 | Futamura et al. | |
| 2018/0044752 | A1* | 2/2018 | Murata | C21D 8/02 |
| 2019/0032187 | A1 | 1/2019 | Yoshitomi et al. | |
| 2019/0127821 | A1 | 5/2019 | Schulz et al. | |
| 2020/0291499 | A1 | 9/2020 | Yoshitomi et al. | |
| 2020/0377978 | A1 | 12/2020 | Yoshitomi et al. | |
| 2021/0115529 | A1 | 4/2021 | Yoshitomi et al. | |

FOREIGN PATENT DOCUMENTS

| | | | |
|---|---|---|---|
| CN | 105793457 | A | 7/2016 |
| CN | 107075643 | A | 8/2017 |
| DE | 102015111177 | A1 | 1/2017 |
| EP | 2474639 | A1 | 7/2012 |
| EP | 2808416 | A1 | 12/2014 |
| EP | 3040440 | A1 | 7/2016 |
| EP | 3075873 | A1 | 10/2016 |
| EP | 3214193 | A1 | 9/2017 |
| EP | 3243923 | A1 | 11/2017 |
| EP | 3409807 | A1 | 12/2018 |
| JP | 609895 | A | 1/1985 |
| JP | 0633213 | A | 2/1994 |
| JP | 2001262271 | A | 9/2001 |
| JP | 2006037130 | A | 2/2006 |
| JP | 2009035793 | A | 2/2009 |
| JP | 2011111670 | A | 6/2011 |
| JP | 2011111675 | A | 6/2011 |
| JP | 2015089946 | A | 5/2015 |
| JP | 2016130358 | A | 7/2016 |
| JP | 2017133102 | A | 8/2017 |
| JP | 2018003114 | A | 1/2018 |
| KR | 20160072898 | A | 6/2016 |
| WO | 2014132637 | A1 | 9/2014 |
| WO | 2014199923 | A1 | 12/2014 |
| WO | 2016038801 | A1 | 3/2016 |
| WO | 2017131055 | A1 | 8/2017 |
| WO | 2017131056 | A1 | 8/2017 |

OTHER PUBLICATIONS

Extended European Search Report for European Application No. 18 901 386.5, dated Dec. 4, 2020, 6 pages.
International Search Report and Written Opinion for International Application No. PCT/JP2018/045856, dated Feb. 26, 2019, 6 pages.
Kim, Y.G., "Thermal Diffusion Behaviors of Electrogalvanized Steel Sheets," Oct. 1995, 10 pages, vol. 28(5), Journal of the Korean Institute of Surface Engineering, with English translation of relevant parts.
Korean Office Action for Korean Application No. 10-2020-7019747, dated Nov. 2, 2021, with partial English translation, 6 pages.
Korean Office Action for Korean Application No. 10-2020-7019747, dated Sep. 15, 2022, with Concise Statement of Relevance of Office Action, 6 pages.
Non Final Office Action for U.S. Appl. No. 16/765,708, dated Mar. 17, 2022, 12 pages.
Non Final Office Action for U.S. Appl. No. 16/766,398, dated Jan. 21, 2022, 9 pages.
Non Final Office Action for U.S. Appl. No. 17/041,680, dated May 6, 2022, 13 pages.
Entire patent prosecution history of U.S. Appl. No. 16/960,733, filed Jul. 8, 2020, entitled, "High-Strength Electrogalvannealed Steel Sheet and Method for Manufacturing the Same."
Korean Written Decision on Registration for Korean Application No. 10-2020-7019747, dated May 30, 2023 with translation, 6 pages.

* cited by examiner

HIGH-STRENGTH ELECTROGALVANNEALED STEEL SHEET AND METHOD FOR MANUFACTURING THE SAME

CROSS REFERENCE TO RELATED APPLICATIONS

This is a Divisional Application of U.S. application Ser. No. 16/960,733, filed Jul. 8, 2020 which is the U.S. National Phase application of PCT/JP2018/045856, filed Dec. 13, 2018, which claims priority to Japanese Patent Application No. 2018-005418, filed Jan. 17, 2018, the disclosures of these applications being incorporated herein by reference in their entireties for all purposes.

FIELD OF THE INVENTION

The present invention relates to a high-strength electrogalvannealed steel sheet that has good formability and high delayed fracture resistance, has excellent surface appearance and high coating adhesion, and is suitable as a member used in industrial fields including automotive industry, and to a method for manufacturing the high-strength electrogalvannealed steel sheet.

BACKGROUND OF THE INVENTION

A recent important issue for preserving the global environment is an improvement in automotive fuel efficiency. To achieve this, an attempt to reduce the weight of a vehicle body itself by strengthening and thinning vehicle body materials becomes more and more active. However, strengthening of a steel sheet leads to low formability. There is thus a need to develop a material having high strength and high formability.

To improve formability, the addition of solid-solution elements, such as Si, Mn, and Cr, to a steel sheet is effective.

A high-strength galvanized steel sheet for automobiles is typically manufactured by hot-dip galvanization. A steel sheet that has been annealed in a reducing atmosphere is cooled and then immersed in molten zinc, whereby the surface of the steel sheet undergoes hot-dip galvanization. In this method, Si, Mn, and Cr, which are added to improve the formability of the steel sheet, form oxides on the surface of the steel sheet during annealing. The oxides degrade the wettability between molten zinc and the steel sheet to generate bare spots. In addition, there is an issue of low coating adhesion even when no bare spot is generated.

The reducing atmosphere used in annealing is typically a hydrogen-containing atmosphere. During annealing, hydrogen is taken into the steel sheet, and the hydrogen degrades the delayed fracture resistance. Furthermore, the hydrogen degrades formability such as bendability and hole expandability.

To solve such issues, Patent Literature 1 proposes a method for suppressing hydrogen embrittlement by forming an internal oxidation layer and a soft layer in the steel sheet surface layer and making use of the internal oxidation layer as a hydrogen trap site.

Patent Literature 2 proposes a method for suppressing generation of bare spots by limiting the hot-rolling coiling temperature to 560° C. or lower and employing electrogalvanization.

Patent Literature

PTL 1: Japanese Unexamined Patent Application Publication No. 2016-130358

PTL 2: Japanese Unexamined Patent Application Publication No. 2001-262271

SUMMARY OF THE INVENTION

In Patent Literature 1, in the case of the presence of a large amount of internal oxide, the internal oxide causes a problem of low corrosion resistance in even a galvanized steel sheet. In addition, the formation of the internal oxide at grain boundaries may reduce the grain boundary strength and thus may degrade the formability of a steel sheet.

In the method disclosed in Patent Literature 2, the steel sheet components and the annealing conditions greatly affect formation of steel sheet surface oxides, and thus in the case of addition of a large amount of Mn, it is impossible to completely suppress formation of surface oxides which inhibit coating adhesion.

Aspects of the present invention have been accomplished in view of the above-mentioned problems. An object according to aspects of the present invention is to provide a high-strength electrogalvannealed steel sheet that has good formability and high delayed fracture resistance and has excellent surface appearance and high coating adhesion and to provide a method for manufacturing the high-strength electrogalvannealed steel sheet. The term "high strength" used herein refers to a tensile strength (TS) of 780 MPa or higher.

To achieve the above object, the inventors of the present invention have carried out intensive studies from the view point of manufacturing method for a steel sheet and, as a result, have made the following findings.

First, the diffusible hydrogen content in a steel sheet greatly affects formability and delayed fracture resistance, and thus there is a need to reduce the hydrogen content. Hydrogen taken into a steel sheet during annealing is released in the cooling and subsequent processes. However, the release rate is low, and thus a sufficient amount of hydrogen is not released in a normal continuous hot-dip galvanization process, so that hydrogen remains in the steel sheet. Since the hydrogen release is greatly affected by the hydrogen concentration in an atmosphere, the hydrogen release is found to be promoted by holding the steel sheet in a low-hydrogen atmosphere after annealing. However, it is also found that the steel sheet surface is slightly oxidized in a low-hydrogen atmosphere and bare spots are generated when the steel sheet is immersed in a hot-dip galvanizing bath.

Thus, an attempt to suppress generation of bare spots has been made by using electrogalvanization instead of hot-dip galvanization. As a result, generation of bare spots can be suppressed, but the coating adhesion is degraded by oxides on the steel sheet surface formed during annealing. However, it becomes apparent that an alloying treatment after electrogalvanization can cause reaction between the coating layer and the steel sheet to improve coating adhesion.

Aspects of the present invention have been accomplished on the basis of the above findings, and are as follows.

[1] A high-strength electrogalvannealed steel sheet having a composition including, in terms of % by mass, C: 0.030% or more and 0.250% or less, Si: 0.01% or more and 3.00% or less, Mn: 1.00% or more and 10.00% or less, P: 0.001% or more and 0.100% or less, and S: 0.0001% or more and 0.0200% or less, with the balance being Fe and unavoidable impurities, wherein the steel sheet has an electrogalvannealed coating layer on the surface thereof, the electrogalvannealed coating layer has an Fe content of 8.0% to 15.0%, the steel sheet has a tensile strength of 780 MPa or higher, and the steel sheet has a diffusible hydrogen content of 0.2 wt. ppm or less.

[2] The high-strength electrogalvannealed steel sheet described in [1], wherein the coating weight of the electrogalvannealed coating layer is 20 $g/m^2$ or more.

[3] The high-strength electrogalvannealed steel sheet described in [1] or [2], wherein the composition further includes, in terms of % by mass, at least one element selected from N: 0.0005% or more and 0.0100% or less, and Ti: 0.005% or more and 0.200% or less.

[4] The high-strength electrogalvannealed steel sheet described in any one of [1] to [3], wherein the composition further includes, in terms of % by mass, at least one element selected from Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.00% or less, V: 0.005% or more and 0.500% or less, Mo: 0.005% or more and 1.000% or less, Cu: 0.005% or more and 1.000% or less, Sn: 0.002% or more and 0.200% or less, Sb: 0.005% or more and 0.100% or less, Ca: 0.0005% or more and 0.0050% or less, Mg: 0.0005% or more and 0.0050% or less, and REM: 0.0005% or more and 0.0050% or less.

[5] A method for manufacturing a high-strength electrogalvannealed steel sheet having a tensile strength of 780 MPa or higher, the method includes:

a heat treatment step of holding a steel sheet in a temperature range of 600° C. or higher and 950° C. or lower in an atmosphere having a $H_2$ concentration of 1.0 vol % or more and 20.0 vol % or less and a dew point of 0° C. or lower for 20 s or longer and 900 s or shorter, the steel sheet having a composition including, in terms of % by mass, C: 0.030% or more and 0.250% or less, Si: 0.01% or more and 3.00% or less, Mn: 1.00% or more and 10.00% or less, P: 0.001% or more and 0.100% or less, and S: 0.0001% or more and 0.0200% or less, with the balance being Fe and unavoidable impurities;

a holding step of cooling the steel sheet to 200° C. to 600° C. after the heat treatment step and then holding the cooled steel sheet in a temperature range of 200° C. to 600° C. in an atmosphere having a $H_2$ concentration of less than 1.0 vol % for 30 s or longer;

an electrogalvanizing step of subjecting the steel sheet to electrogalvanization; and an alloying step of subjecting the electrogalvanized steel sheet to an alloying treatment.

[6] The method for manufacturing a high-strength electrogalvannealed steel sheet described in [5], wherein the composition further includes, in terms of % by mass, at least one element selected from N: 0.0005% or more and 0.0100% or less, and Ti: 0.005% or more and 0.200% or less.

[7] The method for manufacturing a high-strength electrogalvannealed steel sheet described in [5] or [6], wherein the composition further includes, in terms of % by mass, at least one element selected from Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.00% or less, V: 0.005% or more and 0.500% or less, Mo: 0.005% or more and 1.000% or less, Cu: 0.005% or more and 1.000% or less, Sn: 0.002% or more and 0.200% or less, Sb: 0.005% or more and 0.100% or less, Ca: 0.0005% or more and 0.0050% or less, Mg: 0.0005% or more and 0.0050% or less, and REM: 0.0005% or more and 0.0050% or less.

Aspects of the present invention provide a high-strength electrogalvannealed steel sheet that has a TS of 780 MPa or higher, has good formability and high delayed fracture resistance, and has excellent surface appearance and high coating adhesion. The application of the high-strength electrogalvannealed steel sheet according to aspects of the present invention to, for example, automotive structural members reduces the weight of a vehicle body and thus improves fuel efficiency. The high-strength electrogalvannealed steel sheet according to aspects of the present invention therefore has a great industrial value.

DETAILED DESCRIPTION OF EMBODIMENTS OF THE INVENTION

Figure 1:
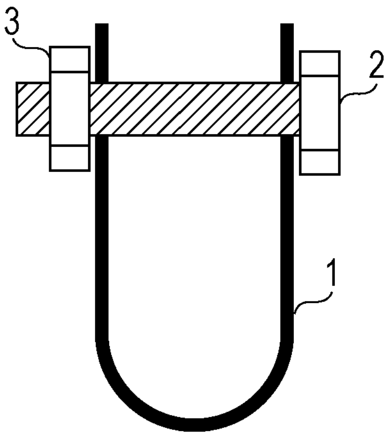
FIG. 1 is a schematic view of a test piece for evaluating a delayed fracture resistance in Examples.

A high-strength electrogalvannealed steel sheet and a method for manufacturing the high-strength electrogalvannealed steel sheet according to aspects of the present invention will be described below in detail.

(1) Composition

The composition of the high-strength electrogalvannealed steel sheet according to aspects of the present invention and the reasons for limiting the composition will be described. The unit "%" for the amounts of the following components means "% by mass" unless otherwise specified.

C: 0.030% or More and 0.250% or Less

Carbon C is an element needed to generate a low-temperature transformation phase, such as martensite, to increase the strength. Carbon C is also an element effective in improving the stability of retained austenite to enhance the ductility of steel. If the C content is less than 0.030%, it is difficult to ensure a desired area fraction of martensite, and desired strength is not obtained. It is also difficult to ensure a sufficient volume fraction of retained austenite, and good ductility is not obtained. From these viewpoints, the C content is 0.030% or more, preferably 0.050% or more, and more preferably 0.080% or more. If C is excessively present in an amount of more than 0.250%, the area fraction of hard martensite is too large and, in the bending test and the hole expansion test, a large number of microvoids are generated at martensite grain boundaries, and furthermore crack propagation proceeds to degrade bendability and stretch flangeability. In addition, weld zones and heat-affected zones are hardened significantly, which degrades mechanical characteristics of the weld zones and thus results in deterioration of spot weldability, arc weldability, and the like. From these viewpoints, the C content is 0.250% or less, preferably 0.200% or less, and more preferably 0.150% or less.

Si: 0.01% or More and 3.00% or Less

Silicon Si is effective in ensuring good ductility since Si improves the work hardenability of ferrite. If the Si content is less than 0.01%, the effect of Si is insufficient. The lower limit of the Si content is thus 0.01%. Therefore, the Si content is 0.01% or more, preferably 0.20% or more, and more preferably 0.50% or more. An excessive Si content of more than 3.00% results in not only embrittlement of steel but also deterioration of surface texture due to generation of red scales and the like. Therefore, the Si content is 3.00% or less, preferably 2.00% or less, and more preferably 1.80% or less.

Mn: 1.00% or More and 10.00% or Less

Manganese Mn is an element that stabilizes retained austenite and is effective in ensuring good ductility. Manganese Mn is also an element that increases the strength of steel through solid solution strengthening. Such effects are observed when the Mn content of steel is 1.00% or more. Therefore, the Mn content is 1.00% or more, preferably 1.20% or more, and more preferably 2.30% or more. However, an excessive Mn content of more than 10.00% leads to high costs. Therefore, the Mn content is 10.00% or less, preferably 8.00% or less, and more preferably 6.00% or less.

P: 0.001% or More and 0.100% or Less

Phosphorus P is an element that has a solid solution strengthening effect and can be added according to desired strength. Phosphorus P is also an element effective in forming a multi-phase structure since P promotes ferrite transformation. To obtain such effects, the P content needs to be 0.001% or more. Therefore, the P content is 0.001% or more, preferably 0.003% or more, and more preferably 0.005% or more. However, a P content of more than 0.100% results in poor weldability and, when the zinc coating is subjected to an alloying treatment, a low alloying rate, which impairs the quality of the zinc coating. Therefore, the P content is 0.100% or less, preferably 0.050% or less, and more preferably 0.020% or less.

S: 0.0001% or More and 0.0200% or Less

Sulfur S segregates at grain boundaries to embrittle steel during hot working and is also present in the form of sulfide to reduce the local deformability. The S content thus needs to be 0.0200% or less. Therefore, the S content is 0.0200% or less, preferably 0.0100% or less, and more preferably 0.0050% or less. However, the S content needs to be 0.0001% or more from restrictions on production technology. Therefore, the S content is 0.0001% or more, preferably 0.0003% or more, and more preferably 0.0005% or more.

The balance other than the components described above is Fe and unavoidable impurities.

The components described above are basic components according to aspects of the present invention. In addition to the above components, at least one of the following elements may be added.

N: 0.0005% or More and 0.0100% or Less

Nitrogen N is an element that degrades the aging resistance of steel. In particular, a N content of more than 0.0100% results in marked degradation of aging resistance. Therefore, when N is added, the N content is 0.0100% or less, preferably 0.0070% or less, and more preferably 0.0050% or less. A lower N content is more preferred, but the N content is preferably 0.0005% or more from restrictions on production technology. When N is added, the N content is more preferably 0.0010% or more, and still more preferably 0.0020% or more.

Ti: 0.005% or More and 0.200% or Less

Titanium Ti is effective in precipitation strengthening of steel. In addition, Ti can reduce a difference in hardness between a hard second phase (martensite or retained austenite) and ferrite by forming relatively hard ferrite and can ensure good stretch flangeability. Such effects are obtained when the Ti content is 0.005% or more. Therefore, when Ti is added, the Ti content is 0.005% or more, preferably 0.010% or more, and more preferably 0.015% or more. However, if the Ti content exceeds 0.200%, the area fraction of hard martensite is too large, and a large number of microvoids are generated at martensite grain boundaries, and furthermore crack propagation proceeds to degrade formability. Therefore, when Ti is added, the Ti content is 0.200% or less, preferably 0.150% or less, and more preferably 0.100% or less.

In accordance with aspects of the present invention, at least one of the following components may further be added.

At Least One Element Selected From Al: 0.01% or More and 2.00% or Less, Nb: 0.005% or More and 0.200% or Less, B: 0.0003% or More and 0.0050% or Less, Ni: 0.005% or More and 1.000% or Less, Cr: 0.005% or More and 1.00% or Less, V: 0.005% or More and 0.500% or Less, Mo: 0.005% or More and 1.000% or Less, Cu: 0.005% or More and 1.000% or Less, Sn: 0.002% or More and 0.200% or Less, Sb: 0.005% or More and 0.100% or Less, Ca: 0.0005% or More and 0.0050% or Less, Mg: 0.0005% or More and 0.0050% or Less, and REM: 0.0005% or More and 0.0050% or Less Al: 0.01% or More and 2.00% or Less Aluminum Al is an element that expands a two-phase region including ferrite and austenite and that is effective in reducing the annealing temperature dependence, that is, effective in material quality stability. Aluminum Al is also an element that works as a deoxidizer and is effective in steel cleanliness. Aluminum Al is preferably added in the deoxidizing step. If the Al content is less than 0.01%, the effect of Al added is insufficient. From these viewpoints, when Al is added, the Al content is 0.01% or more, preferably 0.02% or more, and more preferably 0.03% or more. However, an Al content of more than 2.00% results in a high risk of slab cracking during continuous casting and thus leads to low productivity. From these viewpoints, when Al is added, the Al content is 2.00% or less, preferably 1.20% or less, and more preferably 0.80% or less.

Nb: 0.005% or More and 0.200% or Less

Niobium Nb is effective in precipitation strengthening of steel. The effects of Nb are obtained when the Nb content is 0.005% or more. Like the effects of Ti addition, Nb can reduce a difference in hardness between a hard second phase (martensite or retained austenite) and ferrite by forming relatively hard ferrite and can ensure good stretch flangeability. Such effects are obtained when the Nb content is 0.005% or more. Therefore, when Nb is added, the Nb content is 0.005% or more, preferably 0.010% or more, and more preferably 0.020% or more. However, if the Nb content exceeds 0.200%, the area fraction of hard martensite is too large, and a large number of microvoids are generated at martensite grain boundaries, and furthermore crack propagation proceeds to degrade formability. Such an excessive Nb content leads to high costs. Therefore, when Nb is added, the Nb content is 0.200% or less, preferably 0.150% or less, and more preferably 0.100% or less.

B: 0.0003% or More and 0.0050% or Less

Boron B has an effect of suppressing the formation and growth of ferrite from austenite grain boundaries, which enables flexible structure control. Boron B can thus be added as needed. Such an effect is obtained when the B content is 0.0003% or more. Therefore, when B is added, the B content is 0.0003% or more, preferably 0.0005% or more, and more preferably 0.0010% or more. However, a B content of more than 0.0050% results in low formability. Therefore, when B is added, the B content is 0.0050% or less, preferably 0.0030% or less, and more preferably 0.0040% or less.

Ni: 0.005% or More and 1.000% or Less

Nickel Ni is an element that stabilizes retained austenite and is effective in ensuring good ductility. Nickel Ni is also an element that increases the strength of steel through solid solution strengthening. Such effects are obtained when the Ni content is 0.005% or more. Therefore, when Ni is added, the Ni content is 0.005% or more, preferably 0.008% or more, and more preferably 0.010% or more. However, if the Ni content is more than 1.000%, hard martensite is excessively formed and, in the bending test and the hole expansion test, a large number of microvoids are generated at martensite grain boundaries, and furthermore crack propagation proceeds to degrade bendability and stretch flangeability. Such an excessive Ni content leads to high costs. Therefore, when Ni is added, the Ni content is 1.000% or less, preferably 0.500% or less, and more preferably 0.300% or less.

Cr: 0.005% or More and 1.00% or Less, V: 0.005% or More and 0.500% or Less, Mo: 0.005% or More and 1.000% or Less Chromium Cr, vanadium V, and molybdenum Mo have an effect of improving the balance between strength and ductility and thus can be added as needed. Such an effect is obtained when Cr: 0.005% or more, V: 0.005% or more, and Mo: 0.005% or more. Therefore, when these elements are added, the contents are as follows: Cr: 0.005% or more, V: 0.005% or more, and Mo: 0.005% or more. When these elements are added, the Cr content is preferably 0.010% or more, and more preferably 0.050% or more, the V content is preferably 0.008% or more, and more preferably 0.010% or more, and the Mo content is preferably 0.010% or more, and more preferably 0.050% or more. However, if the Cr, V, and Mo contents respectively exceed 1.00%, 0.500%, and 1.000%, hard martensite is excessively formed, and a large number of microvoids are generated at martensite grain boundaries, and furthermore crack propagation proceeds to degrade formability. Such excessive contents lead to high costs. Therefore, when these elements are added, the Cr, V, and Mo contents are as follows: Cr: 1.00% or less, V: 0.500% or less, Mo: 1.000% or less. When these elements are added, the Cr content is preferably 0.08% or less, and more preferably 0.05% or less, the V content is preferably 0.300% or less, and more preferably 0.100% or less, and the Mo content is preferably 0.800% or less, and more preferably 0.500% or less.

Cu: 0.005% or More and 1.000% or Less

Copper Cu is an element effective in strengthening steel and can be used to strengthen steel within a range specified in accordance with aspects of the present invention. Such an effect is obtained when the Cu content is 0.005% or more. Therefore, when Cu is added, the Cu content is 0.005% or more, preferably 0.008% or more, and more preferably 0.010% or more. However, if the Cu content is more than 1.000%, hard martensite is excessively formed, and a large number of microvoids are generated at martensite grain boundaries, and furthermore crack propagation proceeds to degrade formability. Therefore, when Cu is added, the Cu content is 1.000% or less, preferably 0.800% or less, and more preferably 0.500% or less.

Sn: 0.002% or More and 0.200% or Less, Sb: 0.005% or More and 0.100% or Less

Tin Sn and antimony Sb are added as needed in order to suppress decarburization of a region of about several tens of micrometers from a surface layer of the steel sheet otherwise caused by nitriding or oxidation of the steel sheet surface. Such suppressing of nitriding or oxidation is effective in preventing a reduction in area fraction of martensite on the steel sheet surface to ensure strength and material quality stability. Therefore, when Sn is added, the Sn content is 0.002% or more, preferably 0.005% or more, and more preferably 0.010% or more. When Sb is added, the Sb content is 0.005% or more, preferably 0.008% or more, and more preferably 0.010% or more. However, excessive addition of any one of these elements leads to low toughness. Therefore, when Sn is added, the Sn content is 0.200% or less, preferably 0.100% or less, and more preferably 0.060% or less. When Sb is added, the Sb content is 0.100% or less, preferably 0.050% or less, and more preferably 0.030% or less.

Ca: 0.0005% or More and 0.0050% or Less, Mg: 0.0005% or More and 0.0050% or Less, REM: 0.0005% or More and 0.0050% or Less Calcium Ca, magnesium Mg, and REM are elements effective in spheroidizing the shape of sulfide to reduce the adverse effect of sulfide on hole expandability (stretch flangeability). Such an effect is obtained when each of the contents is 0.0005% or more. Therefore, when Ca, Mg, and REM are added, the amount of each of Ca, Mg, and REM added is 0.0005% or more, preferably 0.0008% or more, and more preferably 0.0010% or more. However, if the amount of each of Ca, Mg, and REM added is more than 0.0050%, the amount of inclusions and the like increases, which causes surface and internal defects and the like. Therefore, when Ca, Mg, and REM are added, the amount of each of Ca, Mg, and REM added is 0.0050% or less, preferably 0.0035% or less, and more preferably 0.0025% or less.

(2) Composition of Coating Layer

Next, the composition of the electrogalvannealed coating layer on the steel sheet surface will be described.

Coating Weight of 20 g/m$^2$ or More

The coating weight is important in order to ensure corrosion resistance. If the coating weight is less than 20 g/m$^2$, it is difficult to ensure corrosion resistance. There is no upper limit of the coating weight. However, if the coating weight is more than 120 g/m$^2$, the exfoliating resistance is inadequate for automotive applications. Thus, the coating weight is preferably 120 g/m$^2$ or less. The coating weight is more preferably from 30 to 60 g/m$^2$.

Fe Content in Electrogalvannealed Coating Layer: 8.0% to 15.0%

In forming an alloy in the coating, Fe—Zn alloy phases, such as a $\zeta$ phase, a $\delta$ phase, and a $\Gamma$ phase, are formed in the coating layer by alloying. If the Fe content is less than 8.0%, the $\zeta$ phase is formed in the coating surface. The $\zeta$ phase is easily exfoliated in the form of scales during pressing since the $\zeta$ phase is soft. Excessive formation of the $\Gamma$ phase, which is hard and brittle, reduces the coating adhesion. The reduction of the coating adhesion is marked when the Fe content in the coating layer is 15.0%. Therefore, the Fe content in the coating layer is 8.0% to 15.0%.

Diffusible Hydrogen Content in Steel Sheet: 0.2 wt. ppm or Less

Diffusible hydrogen in the steel sheet causes delayed fracture of the steel sheet. The larger the diffusible hydrogen content is, the more easily the delayed fracture occurs. If the diffusible hydrogen content is more than 0.2 wt. ppm, cracking occurs in the delayed fracture resistance test described below. Therefore, the diffusible hydrogen content in the steel sheet is 0.2 wt. ppm or less.

(3) Manufacturing Method

Next, the manufacturing method according to aspects of the present invention will be described.

A method for manufacturing a steel sheet used as a raw material in the manufacturing method according to aspects of the present invention is not particularly limited. Examples of the method includes a method in which a steel slab having the above composition is heated and then subjected to rough rolling and finish rolling in a hot-rolling step, the surface layer of the hot-rolled sheet is descaled in a pickling step, and the resulting sheet is cold-rolled. In this method, the conditions of the hot-rolling step, the conditions of the pickling step, the conditions of the cold-rolling step are not particularly limited and may be set appropriately. The steel sheet used as a raw material is typically manufactured by subjecting steel to ordinary steps such as steelmaking, casting, and hot-rolling, as described above. However, the steel sheet may be manufactured by, for example, thin slab casting without part or entire of the hot-rolling step.

Next, the steel sheet having the above composition is subjected to a heating treatment including a heat treatment step and a holding step and then subjected to a coating treatment (an electrogalvanizing step and an alloying step).

Heat treatments Step: Holding in Temperature Range of 600° C. or Higher and 950° C. or Lower in Atmosphere Having $H_2$ Concentration of 1.0 vol % or More and 20.0 vol % or Less and Dew Point of 0° C. or Lower for 20 s or Longer and 900 s or Shorter The heat treatment step is performed to control the structure of the steel sheet and achieve intended material quality.

Hydrogen $H_2$ is needed to suppress Fe oxidation on the steel sheet surface during the heat treatment. If the $H_2$ concentration is less than 1.0 vol %, Fe in the steel sheet surface is oxidized to degrade the coating adhesion. At a $H_2$ concentration of more than 20.0 vol %, the amount of hydrogen absorbed into the steel sheet increases, and hydrogen is not released even in the holding step described below and remains, resulting in low delayed fracture resistance. Therefore, the $H_2$ concentration is 1.0 vol % or more and 20.0 vol % or less. The components in the atmosphere other than $H_2$ are $N_2$ and unavoidable impurities.

If the dew point of the atmosphere is higher than 0° C., decarbonization occurs in the surface layer of the steel sheet to lower the strength of the surface layer of the steel sheet. The lower limit of the dew point is not specified, but a dew point of −60° C. or lower is industrially difficult to realize and leads to a significant increase in costs. Thus, the dew point is preferably higher than −60° C.

If the temperature range of the heat treatment is lower than 600° C., recrystallization does not proceed, which results in low stretch flangeability. However, a temperature of higher than 950° C. causes a great damage to the furnace body of a heating furnace, which leads to an increase in cost. Therefore, the temperature range of the heat treatment is 600° C. or higher and 950° C. or lower.

If the holding time is shorter than 20 s, recrystallization does not proceed sufficiently, which results in low stretch flangeability. If the holding time is longer than 900 s, the furnace length has to be long, which results in low productivity. Therefore, the holding time is 20 s or longer and 900 s or shorter.

Holding Step: Cooling Steel Sheet to 200° C. to 600° C. After Heat Treatment Step and Then Holding Cooled Steel Sheet in Temperature Range of 200° C. to 600° C. in Atmosphere Having $H_2$ Concentration of Less Than 1.0 vol % for 30 s or Longer The holding step is performed to achieve desired strength by transforming austenite formed in the heat treatment step into martensite and to release hydrogen absorbed into the steel sheet.

The cooling rate in cooling the steel sheet to 200° C. to 600° C. after the heat treatment step is not particularly limited and preferably 10° C./s or higher.

At a $H_2$ concentration of 1.0 vol % or more, the hydrogen release is reduced, which results in low delayed fracture resistance. The lower limit of the $H_2$ concentration is not specified, and the atmosphere may be intentionally free of $H_2$, that is, may contain $H_2$ as an unavoidable impurity. The components in the atmosphere other than $H_2$ are not specified. However, to suppress excessive oxidation of the steel sheet surface, the $O_2$ concentration is preferably less than 0.01 vol %, and the dew point is preferably lower than 0° C.

In the holding step, at a steel sheet temperature of lower than 200° C., the hydrogen diffusion rate is low, and the hydrogen release is reduced, which results in low delayed fracture resistance. At a steel sheet temperature of higher than 600° C., martensite is transformed into ferrite, which results in low steel sheet strength. Therefore, the holding temperature is 200° C. to 600° C. If the holding time is shorter than 30 s, the hydrogen release from the steel sheet does not proceed sufficiently, which results in low delayed fracture resistance. Therefore, the holding time is 30 s or longer. The holding time is preferably 500 s or shorter. This is because a long holding time needs a long furnace length and leads to low productivity.

Electrogalvanizing Step

Electrogalvanization is a step of forming an electrogalvanized coating layer on the steel sheet surface by cooling the steel sheet that has been subjected to the heat treatment step. The electrogalvanization conditions are not specified, but the current density is preferably 30 to 1200 $A/dm^2$. To remove oxides formed on the surface in the holding step, the steel sheet is preferably pickled before electrogalvanization. Since there is no need to completely remove oxides, the pickling solution is not specified, and any one of acids, such as hydrochloric acid, sulfuric acid, and nitric acid, can be used.

Alloying Step

The conditions of the alloying treatment are not particularly limited, and the alloying treatment may be performed immediately after electrogalvanization on the same line. When the alloying treatment is performed on the same line, the alloying temperature is preferably 450° C. or higher in consideration of productivity. This is because, at an alloying temperature of lower than 450° C., the alloying rate is low, and the line length for the alloying treatment needs to be long. When the alloying treatment is performed on a different line, the alloying treatment temperature is not limited, and the alloying temperature and the alloying time are controlled such that the Fe content becomes 8.0% to 15.0%.

In electrogalvanization, the coating layer does not contain Al, and zinc in the surface of the coating layer is thus oxidized during the alloying treatment. To avoid this oxidation, the alloying treatment is preferably performed in an atmosphere in which zinc oxidation is suppressed, such as a low oxygen potential atmosphere. When surface oxidation does not cause any problem, the alloying treatment can be performed in the air atmosphere.

In hot-dip galvanization, addition of Al is performed in order to suppress alloying of Fe—Zn in a galvanizing bath, but in electrogalvanization, addition of Al is not necessary. Thus, the coating layer formed by electrogalvanization does not contain Al, or if unavoidably containing Al, contains 0.01 mass % or less Al. Since the high-strength electrogalvannealed steel sheet according to aspects of the present invention is manufactured by electrogalvanization, the Al content of the coating layer is zero, or 0.01 mass % or less if Al is contained unavoidably.

EXAMPLES

Steel having the composition shown in Table 1 was smelted in a converter and continuously casted into a slab.

The obtained slab was hot-rolled, and the hot-rolled steel was pickled and, as needed, then subjected to a cold-rolling step. The heat treatment step and the holding step were carried out under the conditions shown in Table 2-1, Table 2-2, Table 2-3, and Table 3. Subsequently, the electrogalvanizing step and the alloying step were carried out to produce an electrogalvannealed steel sheet. Electrogalvanization was performed in a zinc sulfate bath under the condition of a current density of 100 A/dm$^2$. Pickling was performed in 5% sulfuric acid before electrogalvanization.

Each obtained steel sheet was examined for tensile properties, hole expandability, formability, delayed fracture resistance, surface appearance, and coating adhesion.

<Tensile Properties>

A tensile test was carried out in accordance with JIS Z 2241 (2011) using a JIS No. 5 test piece that was sampled from each steel sheet such that the tensile direction of the test piece was perpendicular to the rolling direction of the steel sheet, whereby the TS (tensile strength) and the EL (total elongation) were measured. The tensile properties

TABLE 1

(% by mass)

| Steel | C | Si | Mn | P | S | N | Ti | Al | Nb | B | Ni |
|---|---|---|---|---|---|---|---|---|---|---|---|
| A | 0.081 | 1.53 | 2.77 | 0.022 | 0.0015 | — | — | — | — | — | — |
| B | 0.121 | 1.42 | 2.15 | 0.002 | 0.0013 | 0.0035 | — | — | — | — | — |
| C | 0.078 | 1.51 | 2.75 | 0.022 | 0.0015 | 0.0040 | — | — | — | — | — |
| D | 0.085 | 1.48 | 2.15 | 0.011 | 0.0007 | 0.0042 | — | — | — | — | — |
| E | 0.114 | 0.48 | 2.51 | 0.009 | 0.0010 | 0.0037 | 0.020 | 0.030 | — | — | — |
| F | 0.195 | 0.45 | 2.62 | 0.002 | 0.0006 | 0.0044 | 0.018 | 0.032 | | — | |
| G | 0.145 | 0.14 | 2.85 | 0.008 | 0.0012 | 0.0035 | 0.002 | 0.030 | 0.021 | 0.0010 | 0.025 |
| H | 0.210 | 0.49 | 2.79 | 0.024 | 0.0022 | — | — | — | — | — | — |
| I | 0.161 | 0.25 | 3.43 | 0.002 | 0.0007 | 0.0037 | 0.048 | 0.035 | — | — | — |
| J | 0.155 | 0.50 | 3.15 | 0.003 | 0.0008 | 0.0041 | 0.052 | 0.037 | — | — | — |
| K | 0.148 | 0.03 | 4.95 | 0.003 | 0.0008 | 0.0034 | 0.038 | 0.042 | — | — | — |
| L | 0.162 | 0.52 | 7.02 | 0.003 | 0.0006 | 0.0029 | 0.038 | 0.040 | — | — | — |
| M | 0.122 | 0.05 | 3.22 | 0.009 | 0.0008 | — | — | — | — | — | — |
| N | 0.106 | 0.11 | 3.74 | 0.008 | 0.0022 | 0.0037 | 0.028 | 0.390 | — | — | — |
| O | 0.075 | 2.49 | 3.61 | 0.016 | 0.0009 | 0.0040 | 0.029 | — | 0.041 | — | — |
| P | 0.124 | 0.03 | 4.56 | 0.025 | 0.0022 | 0.0032 | 0.038 | — | — | 0.0015 | — |
| Q | 0.149 | 0.02 | 5.03 | 0.029 | 0.0018 | 0.0038 | 0.027 | — | — | — | 0.291 |
| R | 0.121 | 0.51 | 2.48 | 0.010 | 0.0011 | 0.0040 | 0.020 | — | — | — | — |
| S | 0.124 | 0.49 | 5.22 | 0.021 | 0.0025 | 0.0042 | 0.019 | — | — | — | — |
| T | 0.155 | 0.27 | 3.48 | 0.024 | 0.0019 | — | — | — | — | — | — |
| U | 0.187 | 1.88 | 2.31 | 0.031 | 0.0011 | 0.0025 | 0.022 | — | — | — | — |
| V | 0.214 | 0.48 | 6.53 | 0.018 | 0.0022 | 0.0032 | 0.035 | — | — | — | — |
| W | 0.118 | 1.08 | 4.13 | 0.009 | 0.0021 | 0.0029 | 0.041 | — | — | — | — |
| X | 0.094 | 0.25 | 3.14 | 0.029 | 0.0009 | 0.0040 | 0.032 | — | — | — | — |
| Y | 0.133 | 0.57 | 5.44 | 0.021 | 0.0024 | 0.0028 | 0.018 | — | — | — | — |
| Z | 0.155 | 0.02 | 3.62 | 0.011 | 0.0031 | 0.0042 | 0.029 | — | — | — | — |
| AA | 0.167 | 5.23 | 2.24 | 0.031 | 0.0021 | 0.003 | 0.042 | — | — | — | — |
| AB | 0.095 | 4.83 | 5.44 | 0.018 | 0.0020 | — | — | — | — | — | — |

| Steel | Cr | V | Mo | Cu | Sn | Ca | Mg | Sb | REM | Note |
|---|---|---|---|---|---|---|---|---|---|---|
| A | — | — | — | — | — | — | — | — | — | Inventive Stee |
| B | — | — | — | — | — | — | — | — | — | Inventive Steel |
| C | — | — | — | — | — | — | — | — | — | Inventive Steel |
| D | — | — | — | — | — | — | — | — | — | Inventive Steel |
| E | 0.59 | — | — | — | — | — | — | — | — | Inventive Steel |
| F | 0.61 | — | — | — | — | — | — | — | — | Inventive Steel |
| G | — | — | — | — | — | — | — | — | — | Inventive Steel |
| H | — | — | — | — | — | — | — | — | — | Inventive Steel |
| I | — | — | — | — | — | — | — | — | — | Inventive Steel |
| J | — | — | — | — | — | — | — | — | — | Inventive Steel |
| K | — | — | — | — | — | — | — | — | — | Inventive Steel |
| L | — | — | — | — | — | — | — | — | — | Inventive Steel |
| M | — | — | — | — | — | — | — | — | — | Inventive Steel |
| N | — | — | — | — | — | — | — | — | — | Inventive Steel |
| O | — | — | — | — | — | — | — | — | — | Inventive Steel |
| P | — | — | — | — | — | — | — | — | — | Inventive Steel |
| Q | — | — | — | — | — | — | — | — | — | Inventive Steel |
| R | 0.31 | — | — | — | — | — | — | — | — | Inventive Steel |
| S | — | 0.19 | — | — | — | — | — | — | — | Inventive Steel |
| T | — | — | 0.11 | — | — | — | — | — | — | Inventive Steel |
| U | — | — | — | 0.003 | — | — | — | — | — | Inventive Steel |
| V | — | — | — | — | 0.005 | — | — | — | — | Inventive Steel |
| W | — | — | — | — | — | 0.002 | — | — | — | Inventive Steel |
| X | — | — | — | — | — | — | 0.002 | — | — | Inventive Steel |
| Y | — | — | — | — | — | — | — | 0.002 | — | Inventive Steel |
| Z | — | — | — | — | — | — | — | — | 0.002 | Inventive Steel |
| AA | — | — | — | — | — | — | — | — | — | Comparative Steel |
| AB | — | — | — | — | — | — | — | — | — | Comparative Steel |

were rated good when EL≥18% for TS 780 MPa grade, EL≥12% for TS 980 MPa grade, EL≥7% for TS 1180 MPa grade or higher.

<Hole Expandability (Stretch Flangeability)>

The hole expandability (stretch flangeability) was evaluated in accordance with The Japan Iron and Steel Federation Standard JFS T 1001. Each obtained steel sheet was cut into a piece of 100 mm×100 mm, and a hole 10 mm in diameter was punched in the piece at a clearance of 12%±1% for a sheet thickness of 2.0 mm or more or at a clearance of 12%±2% for a sheet thickness of less than 2.0 mm. A 60° conical punch was then pushed into the hole in a state where the piece was held at a blank holding force of 9 tons by using a dice 75 mm in inside diameter, and the hole diameter at the crack initiation limit was measured. The hole expansion limit λ (%) was obtained from the following formula, and the stretch flangeability was evaluated on the basis of the value of the hole expansion limit λ. The stretch flangeability was rated good when λ≥25(%).

$$\lambda\ (\%) = \{(Df - D0)/D0\} \times 100$$

wherein Df is a hole diameter (mm) at crack initiation limit, and D0 is an initial hole diameter (mm).

<Formability>

The formability was evaluated on the basis of EL (total elongation) and hole expandability. The formability was rated acceptable (A) when the EL and the hole expandability were both good and rated unacceptable (B) when either the EL or the hole expandability was poor.

<Delayed Fracture Resistance>

A test piece 35 mm in width×100 mm in length was prepared by means of grinding and bent 180° at a radius of curvature R of 4 mm to provide a bending test piece. The bending test piece 1 was fastened with a bolt 2 and nuts 3 such that the distance between the inner surfaces was 8 mm as illustrated in FIG. 1, whereby the shape of the test piece was fixed. A test piece for evaluating a delayed fracture resistance evaluation property was produced accordingly.

This test piece was subjected to two standard delayed fracture resistance evaluation tests. The delayed fracture resistance evaluation is typically performed by hydrochloric acid immersion, but the conditions of hydrochloric acid immersion are much severer than those of actual environments. At this time, a delayed fracture resistance evaluation test under the conditions of salt water immersion, which were close to those of actual environments, was performed in parallel.

In the hydrochloric acid immersion test, hydrochloric acid with a concentration of 5 wt % and a specific solution volume of 60 ml/cm$^2$ was used. The test piece was immersed in this hydrochloric acid. The delayed fracture resistance was rated good (A) when a crack 1 mm or longer was not generated after immersion for 96 hrs, and rated unacceptable (B) when such a crack was generated after immersion for 96 hrs.

Figure 2:
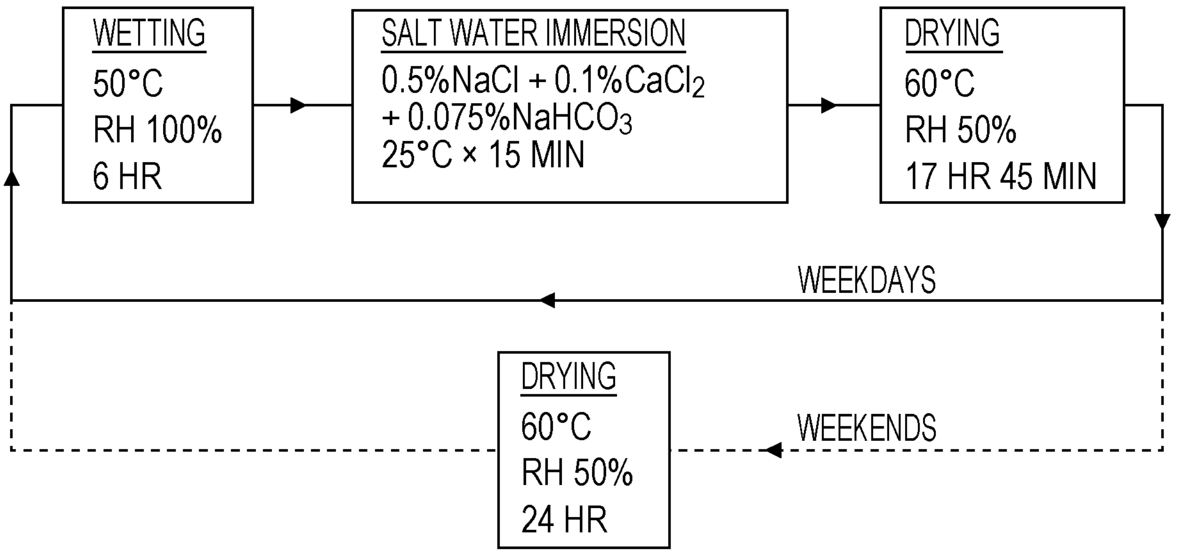
FIG. 2 is a diagram for describing steps of a combined cyclic corrosion test in Examples.

The salt water immersion test was carried out as described below. The combined cyclic corrosion test (see FIG. 2) including drying, wetting, and salt water immersion steps in accordance with SAE J2334 defined by the Society of Automotive Engineers in the United States was carried out up to 40 cycles at most. The presence of cracks was visually checked before the salt water immersion step in each cycle, and the cycle in which cracking occurred was determined. This test was carried out by using 3 samples for each steel sheet, and the evaluation was based on the average value. The delayed fracture resistance was evaluated from the number of cycles on the basis of the following criteria and rated good when the number of cycles was 30 or more.

A: No cracking occurred in 30 or more cycles or 40 cycles.

B: Cracking occurred in 10 or more cycles and less than 30 cycles.

C: Cracking occurred in less than 10 cycles.

<Diffusible Hydrogen Content>

The diffusible hydrogen content in the steel sheet was measured as described below. First, zinc in the surface layer of the steel sheet was removed by mechanical polishing. At this time, the polishing operation was performed in liquid nitrogen to prevent an increase in temperature of the steel sheet. The obtained test piece was heated to 250° C. at a heating rate of 100° C./s in an Ar atmosphere, and the released $H_2$ gas was quantitatively analyzed by gas chromatography.

<Surface Appearance>

The presence of appearance defects, such as bare spots and pinholes was visually checked. The surface appearance was rated good (A) when there were no appearance defects and rated (B) when there were appearance defects.

<Coating Adhesion>

A cellophane tape was attached to the coating surface, and the tape surface was bent 90° and bent back. A cellophane tape 24 mm in width was pressed against the inside (compressed side) of a work portion so as to be in parallel to the bent portion. The cellophane tape was then peeled off, and the amount of exfoliated coating per unit length (1 m) attached to a 40-mm-long portion of the cellophane tape was measured as the number of Zn counts by X-ray fluorescence analysis. The coating adhesion was evaluated on the basis of the following criteria. In this analysis, the mask diameter was 30 mm, the acceleration voltage for X-ray fluorescence 50 KV, the acceleration current 50 mA, and the measurement time 20 s. The grades A and B were acceptable.

A: The number of Zn counts was less than 3000.

B: The number of Zn counts was 3000 or more and less than 5000.

C: The number of Zn counts was 5000 or more and less than 10000.

D: The number of Zn counts was 10000 or more.

<Corrosion Resistance>

The corrosion resistance was evaluated in the SST test. The SST test was carried out by subjecting each sample to chemical conversion coating and electrodeposition and then forming a cut in the sample surface. The corrosion resistance was evaluated by comparing the swelled width around the cut after the SST test with that of mild steel which was a comparative material. The grades A and B are acceptable.

A: The swelled width was similar to that of mild steel.

B: The swelled width was 1.5 or less times that of mild steel.

c: The swelled width was more than 1.5 times that of mild steel.

The results are shown in Table 2-1, Table 2-2, Table 2-3, and Table 3.

TABLE 2-1

| | | Heat Treatment Step | | | | Holding Step | | | Alloying Step | Material Quality | | | |
|---|---|---|---|---|---|---|---|---|---|---|---|---|---|
| No | Steel | $H_2$ (vol %) | Dew Point (° C.) | Heating Temperature (° C.) | Holding Time (s) | $H_2$ (vol %) | Holding Temperature (° C.) | Holding Time (s) | Alloying Temperature (° C.) | TS (MPa) | EL (%) | Hole Expandability (%) | Formability |
| 1 | A | 5.0 | −30 | 800 | 150 | 0.1 | 500 | 150 | 560 | 992 | 18.5 | 70.5 | A |
| 2 | A | 10.0 | −35 | 800 | 60 | 0.2 | 500 | 500 | 560 | 1021 | 13.2 | 70.8 | A |
| 3 | A | 15.0 | −10 | 800 | 200 | 0.1 | 500 | 300 | 520 | 991 | 25.5 | 49.1 | A |
| 4 | A | 5.0 | −30 | 630 | 200 | 1.8 | 500 | 200 | 560 | 1002 | 20.2 | 55.8 | A |
| 5 | A | 5.0 | −40 | 800 | 100 | 0.1 | 250 | 100 | 560 | 1010 | 15.4 | 46.5 | A |
| 6 | B | 5.0 | −45 | 800 | 100 | — | 550 | 100 | 560 | 812 | 20.4 | 64.5 | A |
| 7 | B | 5.0 | −30 | 930 | 150 | 0.1 | 500 | 150 | 560 | 825 | 19.8 | 72.8 | A |
| 8 | B | 5.0 | −30 | 800 | 150 | 0.5 | 500 | 550 | 560 | 819 | 25.5 | 62.9 | A |
| 9 | B | 10.0 | −5 | 800 | 100 | 0.1 | 400 | 200 | 560 | 834 | 21.6 | 48.3 | A |
| 10 | B | 15.0 | −50 | 850 | 100 | 0.2 | 550 | 150 | 560 | 796 | 31.3 | 70.1 | A |
| 11 | C | 10.0 | −20 | 750 | 200 | 0.1 | 500 | 150 | 540 | 1018 | 15.8 | 55.4 | A |
| 12 | C | 5.0 | −20 | 850 | 150 | — | 500 | 150 | 530 | 1108 | 13.3 | 53.8 | A |
| 13 | C | 5.0 | −10 | 800 | 150 | 0.1 | 500 | 150 | 520 | 995 | 23.4 | 48.8 | A |
| 14 | C | 3.0 | −30 | 800 | 300 | 0.5 | 400 | 150 | 560 | 1035 | 13.1 | 51.5 | A |
| 15 | C | 5.0 | −35 | 800 | 150 | 0.5 | 500 | 600 | 560 | 1104 | 15.5 | 50.8 | A |
| 16 | C | 10.0 | −20 | 820 | 150 | 0.3 | 500 | 200 | 540 | 994 | 16.4 | 55.2 | A |
| 17 | D | 5.0 | −30 | 800 | 800 | 0.1 | 450 | 150 | 560 | 1224 | 19.2 | 49.4 | A |
| 18 | D | 5.0 | −50 | 750 | 200 | 1.5 | 500 | 350 | 560 | 1222 | 18.6 | 48.9 | A |
| 19 | D | 5.0 | −40 | 650 | 600 | 0.1 | 500 | 150 | 560 | 1215 | 20.5 | 34.2 | A |
| 20 | D | 5.0 | −10 | 800 | 200 | 0.1 | 500 | 150 | 500 | 1198 | 22.4 | 45.7 | A |
| 21 | D | 5.0 | −30 | 800 | 150 | 0.3 | 500 | 150 | 560 | 1208 | 15.6 | 50.7 | A |
| 22 | E | 5.0 | −30 | 800 | 150 | 0.1 | 500 | 200 | 540 | 1221 | 9.4 | 60.1 | A |
| 23 | E | 5.0 | −35 | 800 | 150 | 0.8 | 300 | 300 | 540 | 1188 | 10.1 | 57.0 | A |
| 24 | E | 5.0 | −20 | 850 | 150 | 0.1 | 450 | 200 | 520 | 1233 | 7.8 | 59.6 | A |
| 25 | E | 5.0 | −20 | 800 | 200 | 0.1 | 300 | 40 | 540 | 1191 | 8.7 | 55.3 | A |

| | Delayed Fracture Resistance | | | | Coating | | | | |
|---|---|---|---|---|---|---|---|---|---|
| No | Salt Water Immersion | Hydrochloric Acid Immersion | Diffusible Hydrogen Content (wt. ppm) | Corrosion Resistance | Coating Weight ($g/m^2$) | Fe Content (%) | Surface Appearance | Adhesion | Note |
| 1 | A | A | 0.08 | A | 50 | 10.8 | A | B | Inventive Example |
| 2 | A | A | 0.05 | A | 100 | 9.4 | A | B | Inventive Example |
| 3 | A | A | 0.06 | A | 50 | 10.2 | A | B | Inventive Example |
| 4 | A | A | 0.16 | A | 50 | 11.2 | A | B | Inventive Example |
| 5 | A | A | 0.18 | A | 50 | 10.8 | A | B | Inventive Example |
| 6 | A | A | 0.04 | A | 80 | 11.5 | A | B | Inventive Example |
| 7 | A | A | 0.07 | A | 50 | 11.2 | A | B | Inventive Example |
| 8 | A | A | 0.17 | A | 50 | 9.7 | A | B | Inventive Example |
| 9 | A | A | 0.11 | A | 50 | 12.4 | A | B | Inventive Example |
| 10 | A | A | 0.12 | A | 60 | 10.5 | A | B | Inventive Example |
| 11 | A | A | 0.08 | A | 50 | 11.5 | A | B | Inventive Example |
| 12 | A | A | 0.04 | A | 50 | 9.9 | A | B | Inventive Example |
| 13 | A | A | 0.09 | A | 50 | 10.8 | A | B | Inventive Example |
| 14 | A | A | 0.17 | A | 50 | 11.1 | A | B | Inventive Example |
| 15 | A | A | 0.06 | A | 50 | 12.4 | A | B | Inventive Example |
| 16 | A | A | 0.11 | A | 45 | 14.7 | A | B | Inventive Example |
| 17 | A | A | 0.13 | A | 50 | 12.2 | A | B | Inventive Example |
| 18 | A | A | 0.15 | A | 50 | 11.8 | A | B | Inventive Example |
| 19 | A | A | 0.12 | A | 80 | 10.4 | A | B | Inventive Example |
| 20 | A | A | 0.13 | A | 50 | 10.5 | A | B | Inventive Example |
| 21 | A | A | 0.11 | A | 50 | 12.1 | A | B | Inventive Example |
| 22 | A | A | 0.08 | A | 40 | 10.3 | A | A | Inventive Example |
| 23 | A | A | 0.17 | A | 50 | 11.5 | A | B | Inventive Example |
| 24 | A | A | 0.09 | A | 50 | 10.7 | A | B | Inventive Example |
| 25 | A | A | 0.18 | A | 50 | 10.9 | A | B | Inventive Example |

—: present as an unavoidable impurity

TABLE 2-2

| | | Heat Treatment Step | | | | Holding Step | | | Alloying Step | Material Quality | | | |
|---|---|---|---|---|---|---|---|---|---|---|---|---|---|
| No | Steel | $H_2$ (vol %) | Dew Point (° C.) | Heating Temperature (° C.) | Holding Time (s) | $H_2$ (vol %) | Holding Temperature (° C.) | Holding Time (s) | Alloying Temperature (° C.) | TS (MPa) | EL (%) | Hole Expandability (%) | Formability |
| 26 | E | 5.0 | −10 | 800 | 60 | 0.3 | 500 | 150 | 540 | 1202 | 8.2 | 49.7 | A |
| 27 | F | 5.0 | −45 | 800 | 150 | 0.3 | 500 | 200 | 550 | 1503 | 8.4 | 42.3 | A |
| 28 | F | 10.0 | −35 | 800 | 150 | 0.3 | 500 | 600 | 540 | 1492 | 8.1 | 44.8 | A |
| 29 | F | 5.0 | −50 | 800 | 100 | — | 500 | 200 | 520 | 1515 | 7.2 | 46.8 | A |
| 30 | F | 5.0 | −20 | 800 | 150 | 0.1 | 500 | 150 | 520 | 1508 | 8.1 | 41.5 | A |
| 31 | F | 5.0 | −30 | 800 | 150 | 0.1 | 500 | 150 | 520 | 1486 | 7.8 | 50.1 | A |
| 32 | G | 5.0 | −30 | 700 | 80 | 0.2 | 500 | 150 | 500 | 1217 | 10.2 | 55.7 | A |
| 33 | G | 5.0 | −40 | 780 | 30 | 0.1 | 400 | 150 | 520 | 1236 | 9.8 | 52.3 | A |
| 34 | G | 5.0 | −30 | 830 | 100 | 0.5 | 500 | 300 | 500 | 1198 | 8.8 | 55.1 | A |
| 35 | G | 5.0 | −30 | 800 | 100 | 0.1 | 500 | 150 | 500 | 1208 | 7.2 | 54.4 | A |
| 36 | G | 5.0 | −50 | 800 | 100 | 0.1 | 500 | 150 | 500 | 1195 | 8.9 | 50.8 | A |
| 37 | H | 5.0 | −50 | 800 | 80 | — | 500 | 150 | 520 | 1388 | 8.9 | 34.5 | A |
| 38 | H | 5.0 | −30 | 800 | 100 | 0.1 | 450 | 150 | 520 | 1376 | 7.6 | 33.6 | A |
| 39 | H | 5.0 | −30 | 700 | 100 | 0.3 | 450 | 100 | 550 | 1411 | 7.2 | 34.8 | A |
| 40 | H | 5.0 | −10 | 800 | 150 | 0.1 | 500 | 100 | 520 | 1406 | 7.8 | 35.1 | A |
| 41 | H | 5.0 | −30 | 800 | 150 | 0.1 | 550 | 100 | 520 | 1394 | 7.4 | 33.7 | A |
| 42 | I | 5.0 | −50 | 700 | 100 | 0.1 | 500 | 100 | 530 | 991 | 23.1 | 26.7 | A |
| 43 | I | 10.0 | −50 | 700 | 100 | 0.1 | 500 | 200 | 530 | 1002 | 18.5 | 25.4 | A |
| 44 | I | 5.0 | −10 | 700 | 50 | 0.1 | 300 | 100 | 550 | 989 | 22.9 | 31.1 | A |
| 45 | I | 15.0 | −30 | 750 | 50 | — | 500 | 150 | 520 | 995 | 22.5 | 26.7 | A |
| 46 | I | 5.0 | −30 | 800 | 100 | 0.1 | 500 | 150 | 500 | 1100 | 19.7 | 30.4 | A |
| 47 | J | 5.0 | −10 | 700 | 150 | 0.1 | 500 | 150 | 540 | 1208 | 16.9 | 26.7 | A |
| 48 | J | 10.0 | −50 | 720 | 100 | 0.1 | 300 | 200 | 520 | 1191 | 18.1 | 30.2 | A |
| 49 | J | 5.0 | −50 | 700 | 100 | 0.3 | 500 | 100 | 520 | 1214 | 16.8 | 25.9 | A |
| 50 | J | 5.0 | −30 | 750 | 100 | 0.1 | 500 | 100 | 550 | 1205 | 16.4 | 26.7 | A |

| | Delayed Fracture Resistance | | | | Coating | | | | |
|---|---|---|---|---|---|---|---|---|---|
| No | Salt Water Immersion | Hydrochloric Acid Immersion | Diffusible Hydrogen Content (wt. ppm) | Corrosion Resistance | Coating Weight ($g/m^2$) | Fe Content (%) | Surface Appearance | Adhesion | Note |
| 26 | A | A | 0.11 | A | 50 | 9.7 | A | A | Inventive Example |
| 27 | A | A | 0.11 | A | 50 | 12.2 | A | B | Inventive Example |
| 28 | A | A | 0.05 | A | 50 | 11.5 | A | B | Inventive Example |
| 29 | A | A | 0.04 | A | 50 | 9.4 | A | A | Inventive Example |
| 30 | A | A | 0.14 | A | 50 | 10.5 | A | B | Inventive Example |
| 31 | A | A | 0.09 | A | 50 | 10.9 | A | B | Inventive Example |
| 32 | A | A | 0.17 | A | 60 | 9.8 | A | A | Inventive Example |
| 33 | A | A | 0.12 | A | 50 | 11.1 | A | B | Inventive Example |
| 34 | A | A | 0.18 | A | 50 | 10.3 | A | B | Inventive Example |
| 35 | A | A | 0.07 | A | 60 | 10.5 | A | B | Inventive Example |
| 36 | A | A | 0.07 | A | 40 | 10.9 | A | A | Inventive Example |
| 37 | A | A | 0.02 | A | 50 | 10.1 | A | B | Inventive Example |
| 38 | A | A | 0.14 | A | 50 | 10.8 | A | B | Inventive Example |
| 39 | A | A | 0.17 | A | 50 | 12.5 | A | B | Inventive Example |
| 40 | A | A | 0.12 | A | 50 | 11.1 | A | B | Inventive Example |
| 41 | A | A | 0.09 | A | 50 | 10.4 | A | A | Inventive Example |
| 42 | A | A | 0.14 | A | 50 | 11.2 | A | B | Inventive Example |
| 43 | A | A | 0.09 | A | 30 | 10.4 | A | B | Inventive Example |
| 44 | A | A | 0.18 | A | 50 | 10.3 | A | B | Inventive Example |
| 45 | A | A | 0.02 | A | 50 | 9.5 | A | A | Inventive Example |
| 46 | A | A | 0.11 | A | 50 | 8.7 | A | A | Inventive Example |
| 47 | A | A | 0.07 | A | 60 | 11.3 | A | B | Inventive Example |
| 48 | A | A | 0.18 | A | 50 | 10.7 | A | B | Inventive Example |
| 49 | A | A | 0.08 | A | 50 | 10.6 | A | B | Inventive Example |
| 50 | A | A | 0.06 | A | 60 | 12.4 | A | B | Inventive Example |

—: present as an unavoidable impurity

TABLE 2-3

| | | Heat Treatment Step | | | | Holding Step | | | Alloying Step | Material Quality | | | |
|---|---|---|---|---|---|---|---|---|---|---|---|---|---|
| No | Steel | $H_2$ (vol %) | Dew Point (° C.) | Heating Temperature (° C.) | Holding Time (s) | $H_2$ (vol %) | Holding Temperature (° C.) | Holding Time (s) | Alloying Temperature (° C.) | TS (MPa) | EL (%) | Hole Expandability (%) | Formability |
| 51 | J | 5.0 | −30 | 800 | 50 | 0.1 | 400 | 150 | 500 | 1232 | 18.9 | 26.6 | A |
| 52 | K | 5.0 | −50 | 680 | 80 | 0.1 | 500 | 200 | 500 | 983 | 26.3 | 27.4 | A |
| 53 | K | 5.0 | −30 | 800 | 80 | — | 500 | 200 | 520 | 1005 | 25.7 | 26.6 | A |
| 54 | K | 10.0 | −30 | 700 | 100 | 0.5 | 500 | 300 | 520 | 994 | 24.6 | 26.4 | A |
| 55 | K | 5.0 | −10 | 650 | 150 | 0.5 | 400 | 300 | 520 | 1130 | 21.5 | 28.5 | A |
| 56 | K | 5.0 | −50 | 680 | 100 | 0.1 | 300 | 100 | 520 | 997 | 24.2 | 27.6 | A |
| 57 | L | 15.0 | −55 | 720 | 180 | 0.1 | 500 | 150 | 500 | 1195 | 21.5 | 75.1 | A |
| 58 | L | 5.0 | −30 | 800 | 180 | 0.1 | 300 | 250 | 500 | 1205 | 21.4 | 77.4 | A |
| 59 | L | 5.0 | −50 | 800 | 80 | 0.3 | 500 | 200 | 520 | 1211 | 21.1 | 74.6 | A |
| 60 | L | 5.0 | −45 | 800 | 100 | 0.3 | 300 | 200 | 520 | 1198 | 22.1 | 60.5 | A |
| 61 | L | 5.0 | −50 | 800 | 100 | 0.3 | 300 | 150 | 520 | 1216 | 23.0 | 68.9 | A |
| 62 | M | 5.0 | −30 | 800 | 100 | 0.1 | 500 | 150 | 540 | 991 | 12.3 | 45.4 | A |
| 63 | N | 5.0 | −50 | 800 | 150 | 0.1 | 500 | 150 | 560 | 1208 | 9.5 | 30.5 | A |
| 64 | N | 10.0 | −40 | 850 | 100 | 0.2 | 500 | 100 | 550 | 1199 | 9.7 | 30.2 | A |
| 65 | O | 5.0 | −10 | 820 | 100 | 0.1 | 400 | 150 | 580 | 810 | 22.7 | 33.7 | A |
| 66 | P | 5.0 | −30 | 800 | 100 | 0.1 | 500 | 200 | 540 | 1064 | 12.9 | 42.6 | A |
| 67 | Q | 5.0 | −30 | 800 | 100 | 0.1 | 500 | 150 | 540 | 1028 | 14.1 | 35.7 | A |
| 68 | R | 5.0 | −20 | 800 | 100 | 0.1 | 300 | 150 | 520 | 984 | 15.0 | 33.6 | A |
| 69 | S | 5.0 | −20 | 800 | 100 | — | 500 | 150 | 540 | 1019 | 12.3 | 33.7 | A |
| 70 | T | 5.0 | −20 | 800 | 100 | 0.1 | 500 | 300 | 540 | 1008 | 25.3 | 50.4 | A |
| 71 | U | 5.0 | −10 | 700 | 80 | 0.1 | 500 | 150 | 580 | 996 | 18.4 | 61.4 | A |
| 72 | V | 5.0 | −15 | 800 | 80 | 0.5 | 500 | 150 | 530 | 1207 | 12.6 | 26.4 | A |
| 73 | W | 5.0 | −20 | 800 | 100 | 0.3 | 500 | 150 | 580 | 1005 | 23.3 | 39.2 | A |
| 74 | X | 5.0 | −50 | 800 | 100 | 0.1 | 500 | 150 | 530 | 799 | 28.4 | 40.4 | A |
| 75 | Y | 5.0 | −40 | 800 | 500 | 1.1 | 500 | 150 | 520 | 1008 | 12.2 | 30.4 | A |

| | Delayed Fracture Resistance | | | | Coating | | | | |
|---|---|---|---|---|---|---|---|---|---|
| No | Salt Water Immersion | Hydrochloric Acid Immersion | Diffusible Hydrogen Content (wt. ppm) | Corrosion Resistance | Coating Weight ($g/m^2$) | Fe Content (%) | Surface Appearance | Adhesion | Note |
| 51 | A | A | 0.11 | A | 50 | 9.5 | A | A | Inventive Example |
| 52 | A | A | 0.14 | A | 50 | 10.2 | A | B | Inventive Example |
| 53 | A | A | 0.04 | A | 50 | 10.9 | A | B | Inventive Example |
| 54 | A | A | 0.13 | A | 50 | 11.4 | A | B | Inventive Example |
| 55 | A | A | 0.15 | A | 50 | 11.1 | A | B | Inventive Example |
| 56 | A | A | 0.17 | A | 50 | 11.7 | A | B | Inventive Example |
| 57 | A | A | 0.16 | A | 100 | 9.9 | A | B | Inventive Example |
| 58 | A | A | 0.09 | A | 50 | 9.7 | A | B | Inventive Example |
| 59 | A | A | 0.12 | A | 50 | 3.4 | A | B | Inventive Example |
| 60 | A | A | 0.14 | A | 50 | 10.5 | A | B | Inventive Example |
| 61 | A | A | 0.12 | A | 50 | 11.6 | A | B | Inventive Example |
| 62 | A | A | 0.07 | A | 40 | 10.6 | A | A | Inventive Example |
| 63 | A | A | 0.13 | A | 50 | 10.8 | A | A | Inventive Example |
| 64 | A | A | 0.08 | B | 22 | 9.5 | A | A | Inventive Example |
| 65 | A | A | 0.19 | A | 50 | 11.5 | A | B | Inventive Example |
| 66 | A | A | 0.11 | A | 60 | 12.4 | A | B | Inventive Example |
| 67 | A | A | 0.08 | A | 50 | 11.6 | A | B | Inventive Example |
| 68 | A | A | 0.08 | A | 50 | 10.8 | A | B | Inventive Example |
| 69 | A | A | 0.03 | A | 50 | 11.4 | A | B | Inventive Example |
| 70 | A | A | 0.07 | A | 50 | 11.5 | A | B | Inventive Example |
| 71 | A | A | 0.11 | A | 30 | 10.8 | A | B | Inventive Example |
| 72 | A | A | 0.14 | A | 50 | 10.3 | A | B | Inventive Example |
| 73 | A | A | 0.07 | A | 50 | 10.7 | A | B | Inventive Example |
| 74 | A | A | 0.06 | A | 50 | 9.7 | A | B | Inventive Example |
| 75 | A | A | 0.06 | A | 60 | 11.4 | A | B | Inventive Example |

—: present as an unavoidable impurity

TABLE 3

| | | Heat Treatment Step | | | | Holding Step | | | Alloying Step | Material Quality | | | |
|---|---|---|---|---|---|---|---|---|---|---|---|---|---|
| No | Steel | $H_2$ (vol %) | Dew Point (° C.) | Heating Temperature (° C.) | Holding Time (s) | $H_2$ (vol %) | Holding Temperature (° C.) | Holding Time (s) | Alloying Temperature (° C.) | TS (MPa) | EL (%) | Hole Expandability (%) | Formability |
| 1 | A | 5.0 | −30 | 800 | 150 | 0.3 | 500 | 150 | — | 992 | 15.5 | 70.5 | A |
| 2 | A | 5.0 | −30 | 800 | 150 | 0.3 | 500 | 10 | 560 | 1003 | 14.6 | 65.7 | A |
| 3 | A | 5.0 | −30 | 800 | 150 | 0.1 | 150 | 150 | 560 | 646 | 28.1 | 64.3 | A |
| 4 | B | 5.0 | −20 | 800 | 150 | 0.3 | 700 | 150 | 540 | 598 | 26.3 | 55.7 | A |
| 5 | B | 5.0 | −30 | 800 | 150 | 10.0 | 500 | 150 | 540 | 815 | 25.7 | 53.0 | A |
| 6 | B | 5.0 | −30 | 850 | 100 | 0.1 | 150 | 150 | 560 | 945 | 16.1 | 12.6 | A |
| 7 | B | 5.0 | −45 | 800 | 100 | 1.8 | 500 | 50 | 520 | 795 | 18.9 | 50.3 | A |
| 8 | C | 5.0 | −30 | 700 | 100 | 0.1 | 500 | 5 | 560 | 1002 | 13.3 | 50.4 | A |
| 9 | C | 5.0 | 5 | 800 | 150 | 0.1 | 500 | 150 | 540 | 698 | 38.0 | 51.6 | A |
| 10 | C | 0.2 | −30 | 800 | 150 | 2.0 | 400 | 50 | 580 | 1034 | 16.2 | 49.1 | A |
| 11 | D | 5.0 | −30 | 750 | 150 | 0.1 | 450 | 100 | — | 1246 | 9.2 | 38.9 | A |
| 12 | D | 5.0 | −30 | 750 | 150 | 5.0 | 450 | 150 | 560 | 1197 | 9.3 | 40.4 | A |
| 13 | D | 5.0 | −30 | 800 | 150 | 0.1 | 450 | 5 | 550 | 1203 | 9.2 | 45.2 | A |
| 14 | E | 15.0 | −30 | 500 | 300 | 0.1 | 150 | 250 | 560 | 1285 | 6.6 | 15.4 | B |
| 15 | E | 5.0 | −30 | 800 | 150 | 0.1 | 150 | 150 | 530 | 678 | 25.2 | 26.3 | A |
| 16 | E | 5.0 | 10 | 800 | 150 | 0.1 | 450 | 200 | 530 | 628 | 9.1 | 27.1 | A |
| 17 | F | 5.0 | −30 | 800 | 150 | 0.1 | 280 | 10 | 530 | 1400 | 8.8 | 26.5 | A |
| 18 | F | 5.0 | −30 | 800 | 150 | 5.0 | 400 | 150 | 550 | 1385 | 9.6 | 27.6 | A |
| 19 | F | 5.0 | −30 | 750 | 200 | 0.1 | 450 | 10 | 530 | 1396 | 8.1 | 13.1 | B |
| 20 | G | 0.1 | −30 | 800 | 150 | 0.1 | 500 | 150 | 600 | 1212 | 8.4 | 50.2 | A |
| 21 | G | 10.0 | −30 | 750 | 100 | 0.3 | 500 | 150 | 530 | 1205 | 8. | 49.6 | A |
| 22 | G | 5.0 | −30 | 800 | 150 | 3.0 | 500 | 150 | 500 | 1186 | 8.8 | 51.3 | A |
| 23 | G | 5.0 | −30 | 700 | 150 | 0.1 | 500 | 15 | 500 | 1224 | 9.4 | 50.3 | A |
| 24 | H | 5.0 | −30 | 800 | 150 | 5.0 | 500 | 150 | 530 | 1368 | 9.5 | 34.6 | A |
| 25 | H | 5.0 | −30 | 800 | 5 | 15.0 | 500 | 150 | 530 | 995 | 12.8 | 14.4 | B |
| 26 | H | 5.0 | −30 | 850 | 150 | 0.1 | 300 | 20 | 530 | 1402 | 8.8 | 35.5 | A |
| 27 | I | 5.0 | −30 | 800 | 150 | 2.0 | 500 | 150 | 520 | 998 | 9.2 | 26.1 | A |
| 28 | I | 5.0 | −30 | 900 | 150 | 0.1 | 500 | 10 | 540 | 1003 | 8.8 | 11.2 | B |
| 29 | I | 5.0 | −30 | 800 | 100 | 0.5 | 500 | 150 | — | 1100 | 9.9 | 25.8 | A |
| 30 | J | 5.0 | −30 | 800 | 150 | 5.0 | 350 | 150 | 520 | 1218 | 8.1 | 26.6 | A |
| 31 | J | 5.0 | −30 | 800 | 150 | 0.1 | 750 | 150 | 520 | 586 | 25.7 | 32.1 | A |
| 32 | J | 0.5 | −30 | 800 | 150 | 0.1 | 500 | 150 | 580 | 1244 | 9.8 | 26.8 | A |
| 33 | K | 5.0 | −30 | 800 | 150 | 3.0 | 500 | 150 | 500 | 989 | 24.5 | 27.1 | A |
| 34 | K | 5.0 | −30 | 850 | 150 | 0.5 | 800 | 150 | 500 | 583 | 22.4 | 28.3 | A |
| 35 | K | 5.0 | 10 | 800 | 150 | 0.1 | 450 | 150 | 500 | 684 | 21.4 | 27.3 | A |
| 36 | L | 5.0 | −30 | 800 | 150 | 5.0 | 550 | 150 | 520 | 1222 | 20.1 | 26.5 | A |
| 37 | L | 5.0 | −30 | 800 | 5 | 0.1 | 450 | 150 | 580 | 945 | 12.4 | 12.5 | B |
| 38 | L | 5.0 | −30 | 800 | 150 | 0.1 | 500 | 5 | 520 | 1216 | 21.1 | 26.8 | A |
| 39 | AA | 5.0 | −30 | 800 | 150 | 0.1 | 500 | 200 | 560 | 1402 | 7.2 | 11.1 | B |
| 40 | AB | 5.0 | −30 | 800 | 150 | 0.3 | 500 | 10 | 580 | 1533 | 7.2 | 8.9 | B |

| | Delayed Fracture Resistance | | | | Coating | | | | |
|---|---|---|---|---|---|---|---|---|---|
| No | Salt Water Immersion | Hydrochloric Acid Immersion | Diffusible Hydrogen Content (wt. ppm) | Corrosion Resistance | Coating Weight (g/m²) | Fe Content (%) | Surface Appearance | Adhesion | Note |
| 1 | A | A | 0.04 | A | 50 | 0.2 | A | D | Comparative Example |
| 2 | C | B | 0.37 | A | 50 | 11.2 | A | B | Comparative Example |
| 3 | B | B | 0.40 | A | 50 | 10.5 | A | B | Comparative Example |
| 4 | A | A | 0.12 | A | 100 | 9.8 | A | B | Comparative Example |
| 5 | C | B | 0.58 | A | 50 | 9.9 | A | B | Comparative Example |
| 6 | C | B | 0.49 | A | 50 | 11.5 | A | B | Comparative Example |
| 7 | C | B | 0.24 | B | 35 | 10.8 | A | B | Comparative Example |
| 8 | C | B | 0.40 | A | 40 | 10.4 | A | B | Comparative Example |
| 9 | A | A | 0.08 | A | 50 | 10.9 | A | B | Comparative Example |
| 10 | A | A | 0.33 | A | 50 | 12.6 | A | D | Comparative Example |
| 11 | A | A | 0.08 | A | 80 | 0.3 | A | D | Comparative Example |
| 12 | C | B | 0.31 | A | 50 | 12.1 | A | B | Comparative Example |
| 13 | C | B | 0.44 | A | 60 | 11.5 | A | B | Comparative Example |
| 14 | C | B | 0.66 | A | 50 | 11.6 | A | B | Comparative Example |
| 15 | B | B | 0.39 | A | 50 | 10.5 | A | B | Comparative Example |
| 16 | A | A | 0.14 | A | 100 | 10.9 | A | D | Comparative Example |
| 17 | C | B | 0.49 | A | 50 | 11.1 | A | B | Comparative Example |
| 18 | C | B | 0.45 | A | 50 | 10.5 | A | B | Comparative Example |
| 19 | C | B | 0.51 | A | 40 | 9.9 | A | B | Comparative Example |
| 20 | A | A | 0.13 | B | 50 | 16.8 | A | D | Comparative Example |
| 21 | A | A | 0.15 | C | 15 | 10.3 | A | B | Inventive Example |
| 22 | C | B | 0.38 | A | 50 | 9.5 | A | A | Comparative Example |
| 23 | C | B | 0.47 | A | 100 | 9.2 | A | A | Comparative Example |

TABLE 3-continued

| | | | | | | | | | |
|---|---|---|---|---|---|---|---|---|---|
| 24 | C | B | 0.52 | A | 50 | 10.5 | A | B | Comparative Example |
| 25 | C | B | 0.32 | A | 50 | 9.8 | A | B | Comparative Example |
| 26 | C | B | 0.44 | A | 50 | 10.1 | A | B | Comparative Example |
| 27 | B | B | 0.35 | A | 50 | 10.7 | A | B | Comparative Example |
| 28 | C | B | 0.57 | A | 50 | 11.7 | A | B | Comparative Example |
| 29 | A | A | 0.06 | A | 60 | 0.2 | A | D | Comparative Example |
| 30 | C | B | 0.44 | A | 50 | 11.7 | A | B | Comparative Example |
| 31 | A | A | 0.21 | A | 50 | 11.3 | A | B | Comparative Example |
| 32 | A | A | 0.19 | B | 100 | 16.8 | A | D | Comparative Example |
| 33 | C | B | 0.52 | A | 50 | 10.5 | A | B | Comparative Example |
| 34 | A | A | 0.11 | A | 50 | 9.7 | A | A | Comparative Example |
| 35 | A | A | 0.12 | A | 50 | 10.2 | A | D | Comparative Example |
| 36 | C | B | 0.47 | A | 50 | 10.7 | A | B | Comparative Example |
| 37 | A | A | 0.16 | A | 80 | 17.1 | A | D | Comparative Example |
| 38 | C | B | 0.51 | A | 50 | 10.9 | A | B | Comparative Example |
| 39 | C | B | 0.11 | A | 50 | 9.2 | A | B | Comparative Example |
| 40 | C | C | 0.15 | A | 50 | 11.2 | A | D | Comparative Example |

All the high-strength steel sheets according to Inventive Examples are high-strength electrogalvannealed steel sheets that have a TS of 780 MPa or higher, has good formability and high delayed fracture resistance, and has excellent surface appearance and high coating adhesion. In Comparative Examples, any one of these properties is poor.

INDUSTRIAL APPLICABILITY

According to aspects of the present invention, a high-strength electrogalvannealed steel sheet that has a TS (tensile strength) of 780 MPa or higher, has good formability and high delayed fracture resistance, and has excellent surface appearance and high coating adhesion can be manufactured. The application of the high-strength electrogalvannealed steel sheet according to aspects of the present invention to, for example, automotive structural members reduces the weight of a vehicle body and thus improves fuel efficiency. Thus, the high-strength electrogalvannealed steel sheet according to aspects of the present invention has a great industrial value.

REFERENCE SIGNS LIST

1 Bending test piece
2 Bolt
3 Nut

The invention claimed is:

1. A method for manufacturing a high-strength electrogalvannealed steel sheet having a tensile strength of 780 MPa or higher, the method comprising:

a heat treatment step of holding a steel sheet in a temperature range of 600° C. or higher and 950° C. or lower in an atmosphere having a $H_2$ concentration of 1.0 vol % or more and 20.0 vol % or less and a dew point of 0° C. or lower for 20 s or longer and 900 s or shorter, the steel sheet having a composition comprising, in terms of % by mass, C: 0.030% or more and 0.250% or less,
Si: 0.01% or more and 3.00% or less,
Mn: 1.00% or more and 10.00% or less,
P: 0.001% or more and 0.100% or less, and
S: 0.0001% or more and 0.0200% or less, with the balance being Fe and unavoidable impurities;

a holding step of cooling the steel sheet to 200° C. to 600° C. after the heat treatment step and then holding the cooled steel sheet in a temperature range of 200° C. to 600° C. in an atmosphere having a $H_2$ concentration of less than 1.0 vol % and an $O_2$ concentration of less than 0.01 vol % for 30 s or longer;

an electrogalvanizing step of subjecting the steel sheet after the holding step to electrogalvanization; and an alloying step of subjecting the electrogalvanized steel sheet to an alloying treatment.

2. A method for manufacturing a high-strength electrogalvannealed steel sheet having a tensile strength of 780 MPa or higher, the method comprising:

a heat treatment step of holding a steel sheet in a temperature range of 600° C. or higher and 950° C. or lower in an atmosphere having a $H_2$ concentration of 1.0 vol % or more and 20.0 vol % or less and a dew point of 0° C. or lower for 20 s or longer and 900 s or shorter, the steel sheet having a composition comprising, in terms of % by mass, C: 0.030% or more and 0.250% or less,
Si: 0.01% or more and 3.00% or less,
Mn: 1.00% or more and 10.00% or less,
P: 0.001% or more and 0.100% or less, and
S: 0.0001% or more and 0.0200% or less, with the balance being Fe and unavoidable impurities;

a holding step of cooling the steel sheet to 200° C. to 600° C. after the heat treatment step and then holding the cooled steel sheet in a temperature range of 200° C. to 600° C. in an atmosphere having a $H_2$ concentration of less than 1.0 vol % for 30 s or longer;

an electrogalvanizing step of subjecting the steel sheet after the holding step to electrogalvanization; and an alloying step of subjecting the electrogalvanized steel sheet to an alloying treatment, wherein the high-strength electrogalvannealed steel sheet has a diffusible hydrogen content of 0.2 wt ppm or less.

3. A method for manufacturing a high-strength electrogalvannealed steel sheet having a tensile strength of 780 MPa or higher, the method comprising:

a heat treatment step of holding a steel sheet in a temperature range of 600° C. or higher and 950° C. or lower in an atmosphere having a $H_2$ concentration of 1.0 vol % or more and 20.0 vol % or less and a dew point of 0° C. or lower for 20 s or longer and 900 s or shorter, wherein the heat treatment step suppresses decarburization that lowers the strength of a surface layer of the steel sheet, the steel sheet having a composition comprising, in terms of % by mass, C: 0.030% or more and 0.250% or less,
Si: 0.01% or more and 3.00% or less, Mn: 1.00% or more and 10.00% or less, P: 0.001% or more and 0.100% or less, and S: 0.0001% or more and 0.0200% or less, with the balance being Fe and unavoidable impurities;

a holding step of cooling the steel sheet to 200° C. to 600° C. after the heat treatment step and then holding the cooled steel sheet in a temperature range of 200° C. to 600° C. in an atmosphere having a $H_2$ concentration of less than 1.0 vol % for 30 s or longer;

an electrogalvanizing step of subjecting the steel sheet after the holding step to electrogalvanization; and an alloying step of subjecting the electrogalvanized steel sheet to an alloying treatment.

4. The method for manufacturing a high-strength electrogalvannealed steel sheet according to claim 1, wherein the composition further comprises, in terms of % by mass, at least one element selected from N: 0.0005% or more and 0.0100% or less, and Ti: 0.005% or more and 0.200% or less.

5. The method for manufacturing a high-strength electrogalvannealed steel sheet according to claim 1, wherein the composition further comprises, in terms of % by mass, at least one element selected from Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.00% or less, V: 0.005% or more and 0.500% or less, Mo: 0.005% or more and 1.000% or less, Cu: 0.005% or more and 1.000% or less, Sn: 0.002% or more and 0.200% or less, Sb: 0.005% or more and 0.100% or less, Ca: 0.0005% or more and 0.0050% or less, Mg: 0.0005% or more and 0.0050% or less, and REM: 0.0005% or more and 0.0050% or less.

6. The method for manufacturing a high-strength electrogalvannealed steel sheet according to claim 4, wherein the composition further comprises, in terms of % by mass, at least one element selected from Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.00% or less, V: 0.005% or more and 0.500% or less, Mo: 0.005% or more and 1.000% or less, Cu: 0.005% or more and 1.000% or less, Sn: 0.002% or more and 0.200% or less, Sb: 0.005% or more and 0.100% or less, Ca: 0.0005% or more and 0.0050% or less, Mg: 0.0005% or more and 0.0050% or less, and REM: 0.0005% or more and 0.0050% or less.

7. The method for manufacturing a high-strength electrogalvannealed steel sheet according to claim 1, wherein, the holding time in the temperature range of 200° C. to 600° C. in the atmosphere having the $H_2$ concentration of less than 1.0 vol % and the $O_2$ concentration of less than 0.01 vol % in the holding step is 30 s or longer and 600 s or shorter.

* * * * *